April 2, 1935.  J. W. TATTER  1,996,444
BRAKE
Filed July 7, 1930
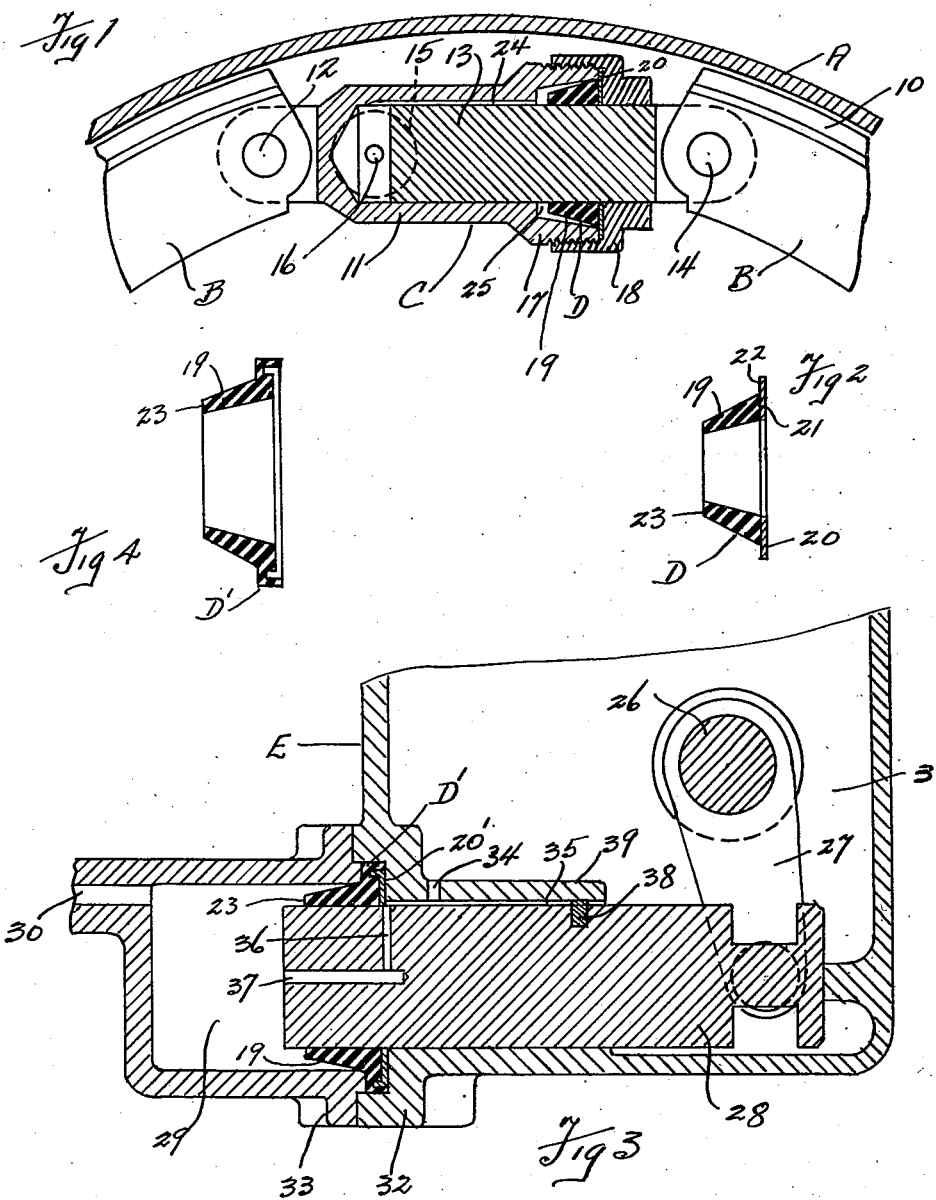
INVENTOR.
John W. Tatter
BY
ATTORNEY.

Patented Apr. 2, 1935

1,996,444

UNITED STATES PATENT OFFICE 1,996,444

BRAKE

John W. Tatter, Detroit, Mich., assignor, by mesne assignments, to William H. Pascoe, Chicago, Ill., as receiver for Lewis Differential Company, a corporation of Illinois Application July 7, 1930, Serial No. 465,856

3 Claims. (Cl. 60—54.6)

This invention relates to brakes and refers more particularly to fluid brakes more commonly called hydraulic brakes such as are used in connection with motor vehicles. My invention is particularly related to an improved fluid seal and related structures for brake systems of the class referred to.

It is an object of my invention to provide a simplified and more effective fluid seal structure thereby lessening the cost of manufacture and facilitating the effectiveness and servicing of the brake.

Other objects and advantages of my brake system will be apparent from the following illustrated embodiments of my invention in which Figure 1 represents a section of a brake drum and associated shoe means and fluid actuator therefor, Figure 2 is a detail sectional view of my improved sealing element, Figure 3 is a sectional view of a master cylinder or fluid pressure inducing device, and Figure 4 is a detail sectional view of the sealing element illustrated in Figure 3.

In the drawing reference character A represents the usual brake drum, B the shoe means with associated friction lining 10 and C the shoe expanding unit, the shoe means here being illustrated as the internal expanding type. The unit C comprises a cylinder 11 connected at 12 with the shoe and a piston 13 likewise connected at 14 to act on the shoe means on relative separation axially of the cylinder 11 and piston 13, such separation being effected by fluid pressure introduced from the usual conduit 15 and opening 16 for the cylinder 11. This cylinder may have an enlarged end 17 threadedly receiving nut 18 which clamps the sealing assembly D in position. This assembly as shown in Figure 2 consists of a rubber cylinder backed with a washer 20 vulcanized at 21 to the rubber and extending outwardly therefrom at 22 for clamping engagement by the nut 18. The rubber ring 19 is preferably molded tapering as shown in Figure 2 so that its free end 23 resiliently presses against piston 13 assisting the sealing action. I may also provide a groove 24 in the cylinder 11 whereby the fluid pressure developed in the sealing chamber 25 against the sealing ring 19 to positively press the ring against the piston to prevent escape of fluid past the piston.

My invention is also adaptable to the master cylinder E which may have the usual rockshaft 26 actuated by the brake pedal (not shown) whereby arm 27 acts on piston 28 to induce pressure on fluid in chamber 29 leading at 30 through the usual conduits to the openings 16 of the various wheel cylinders 11. The master cylinder E has the usual fluid replenishing reservoir 31. Clamped between the casing portions 32, 33 of the master cylinder is the sealing structure D' which is similarly formed as the seal D except that in Figures 3 and 4 the washer 20' is molded into the rubber sealing element. In the retracted position of piston 28 as in Figure 3 the reservoir 31 preferably communicates with chamber 29 although on moving piston 28 this communication is cut off. For this purpose an opening 34 in cylinder 39 communicates with groove 35 leading to piston ports 36, 37, the piston being restrained from turning during movement thereof by a pin 38 slidingly engaging cylinder groove 35. The washer 20' forms a positive cut off for port 36 on movement of piston 28. In Figure 4 the sealing element D' is shown molded without the washer 20' but adapted to receive this washer.

What I claim as my invention is:

1. In a fluid brake system, the combination of a reservoir, a fluid cylinder having a cylinder portion provided with a groove extending longitudinally thereof, the cylinder portion of said fluid cylinder being further provided with a passage connecting the groove extending longitudinally thereof with said reservoir, a piston movably mounted in the cylinder portion of said fluid cylinder, said piston being provided with a member engaging the groove extending longitudinally of the cylinder portion of said fluid cylinder to restrain said piston from turning, said piston being further provided with a passage connecting with the groove extending longitudinally of the cylinder portion of said fluid cylinder, and means for closing the passage of said piston.

2. In a fluid brake system, the combination of a master cylinder provided with a fluid reservoir and a fluid chamber, together with a bore connecting said fluid reservoir and said fluid chamber, said bore being provided with a groove extending throughout its length, a piston movably mounted in the bore of said master cylinder, said piston being provided with a passage connecting said groove with said fluid chamber, and a member suitably mounted in said piston and slidably engaging said groove.

3. In a fluid brake system, the combination of a housing provided with a fluid reservoir together with a pressure chamber together with a walled cylinder bore located therein, said cylinder bore being provided with a groove extending longitudinally thereof together with a passage extending through the wall portion of said cylinder bore, said passage extending from said fluid reservoir to said groove, and a piston movably mounted in said cylinder bore, said piston being provided with a passage connecting said groove with said pressure chamber, said piston being provided with a pin member extending within and engaging the groove of said cylinder.

JOHN W. TATTER.